Figure 1:
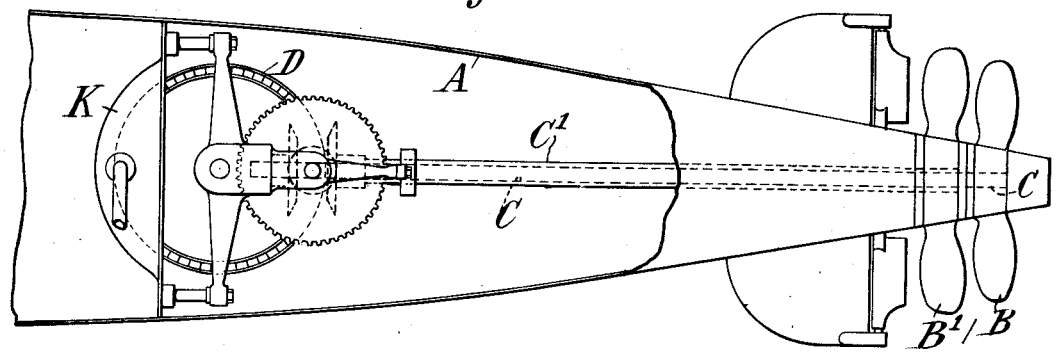

F. M. LEAVITT.
DRIVING MECHANISM FOR TORPEDOES
APPLICATION FILED APR. 8, 1912.

1,088,080.

Patented Feb. 24, 1914.
2 SHEETS—SHEET 1.

WITNESSES:
René Bruine
Fred White

INVENTOR:
Frank M. Leavitt,
By Attorneys,
Fraser, Burke & Myers

F. M. LEAVITT.
DRIVING MECHANISM FOR TORPEDOES.
APPLICATION FILED APR. 8, 1912.

1,088,080.

Patented Feb. 24, 1914.
2 SHEETS—SHEET 2.

WITNESSES:
René Bruine
Fred White

INVENTOR:
Frank M. Leavitt,
By Attorneys,
Fraser, Burk & Myers

UNITED STATES PATENT OFFICE.

FRANK M. LEAVITT, OF SMITHTOWN, NEW YORK, ASSIGNOR TO E. W. BLISS COMPANY, OF BROOKLYN, NEW YORK, A CORPORATION OF WEST VIRGINIA.

DRIVING MECHANISM FOR TORPEDOES.

1,088,080.    Specification of Letters Patent.    Patented Feb. 24, 1914.

Application filed April 8, 1912. Serial No. 689,136.

*To all whom it may concern:*

Be it known that I, FRANK M. LEAVITT, a citizen of the United States, residing in Smithtown, in the county of Suffolk and State of New York, have invented certain new and useful Improvements in Driving Mechanism for Torpedoes, of which the following is a specification.

This invention provides improved means for driving automobile torpedoes by means of a turbine engine.

An automobile torpedo has necessarily two screw propellers which revolve in opposite directions in order that each may counteract the tendency of the other to cause the torpedo to roll. To insure that they shall be driven at a uniform speed they are necessarily geared together. For this purpose it has heretofore been customary to introduce four miter gears in the tail section of the torpedo, one of these being fixed upon the engine shaft upon a prolongation of which the after-propeller is carried, the opposite miter being mounted on a hollow shaft carrying the forward propeller, and the remaining miters being idlers for merely reversing the motion from the driving to the driven miter gear. The presence of these miter gears in the tail section is inconvenient, and one object of the present invention is to avoid their necessity.

In the application of a fluid pressure turbine for driving a torpedo it is necessary to gear down from the turbine to the propellers in order that the turbine may revolve at the high speed at which it gives its best efficiency, and the propellers at a very much lower speed.

One object of the present invention is to combine the gearing for this purpose with that which is required to maintain the correct ratio of speed between the oppositely revolving propellers.

In driving the torpedo by means of a turbine it is desirable, for reasons fully explained in United States patent to Davison, No. 858,266, granted June 25, 1907, to provide two turbine wheels revolving in opposite direction at equal speeds. This involves that the turbine wheels shall be connected through gearing in order to maintain a uniform speed ratio between them. The present invention combines the gearing for this purpose with that required for speed diminution and for revolving the propellers in opposite directions at equal speeds. In my Patent No. 748,759, of January 5, 1904, and in said Davison patent, the turbine is mounted upon an axis co-incident with the major axis or center line of the torpedo. The present invention locates the oppositely revolving turbines in a plane perpendicular thereto so that they turn around an axis transverse to the torpedo.

Figure 2:
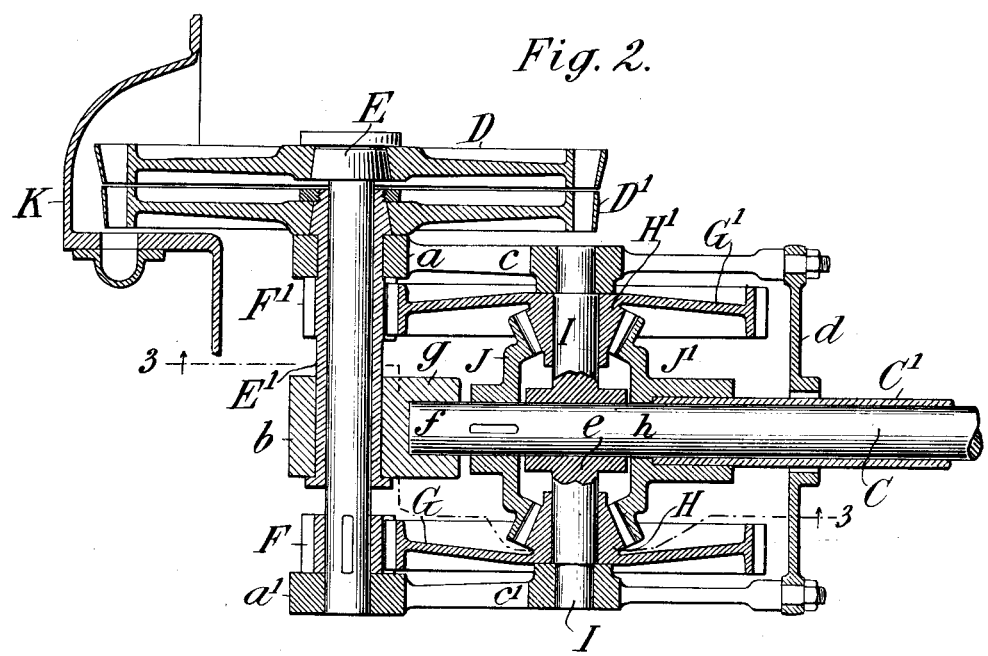
Figure 3:
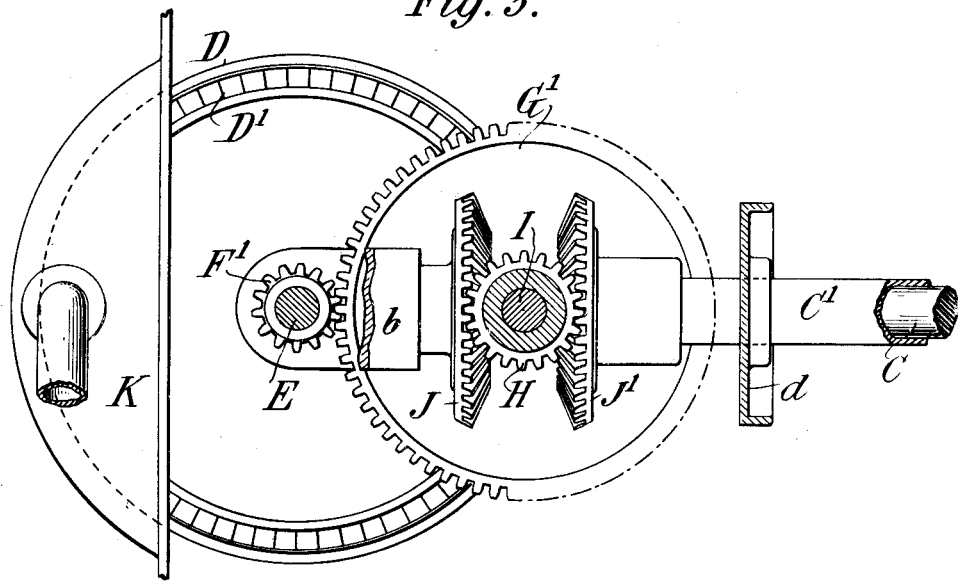
Figure 4:
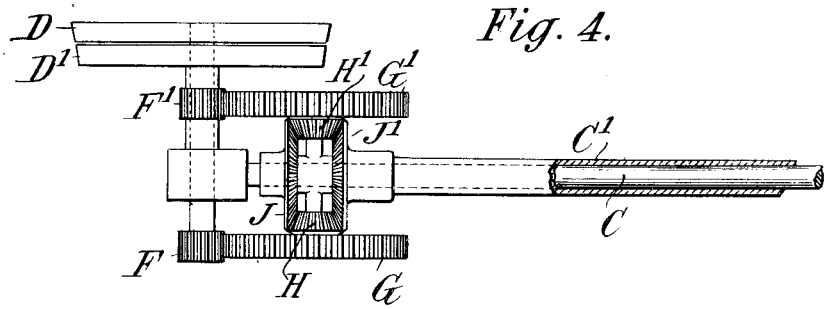

In the accompanying drawings Figure 1 is a longitudinal section of the after-portion of the torpedo hull showing the propelling mechanism in elevation. Fig. 2 is a vertical mid-section of the turbine engine and gearing on a larger scale. Fig. 3 is a view partly in elevation and partly in section cut on the plane of the line 3—3 in Fig. 2. Fig. 4 is a diagrammatic view showing the gearing in simplified form.

In the drawings A is the torpedo hull, B B' are the propellers, C C' the propeller shafts and D D' the turbines. The inner shaft C carries the after-propeller B, while the outer or tubular shaft C' carries the forward propeller B'. The turbine D is mounted on an inner shaft E, while the turbine D' is mounted on a tubular shaft E' surrounding the shaft E. These turbines revolve in opposite directions at preferably like speeds. The shafts E E' carry respectively pinions F F', preferably of equal size, and these mesh with relatively large gear wheels G and G' which carry bevel pinions H H' respectively. These pinions mesh with larger bevel gears J and J' which are mounted respectively on the shafts C and C'. The gears J and J' mesh with both pinions and thus constitute a nest of gearing which serves on the one hand for connecting the turbine wheels D D' so that these are compelled to revolve in contrary directions at a predetermined speed ratio; and on the other hand to connect the shafts C C' so that the propellers are compelled to turn in contrary directions at a determined speed ratio. The system of gearing also, by reason of the step down which occurs between the pinions F F' and the gears G G', and the second step down which occurs between the pinions H H' and gears J J', accomplishes the desired reduction of speed between the turbines and propellers. The entire group of gearing is arranged adjacent to the turbine instead of the reversing gears being located, as heretofore, in the tail section; thus the same gearing serves the triple purpose of reduction gearing, of connecting the turbine wheels that revolve at equal speeds, and of reversing the direction of rotation of the respective propellers and maintaining their rotation at uniform speed ratios.

The several shafts and gears may be variously mounted. In the construction shown the shafts E E' are carried in bearings $a\ a'$, $b$, the bearings $a\ a'$ being formed in frames $c\ c'$ which are connected at their opposite ends by a yoke $d$, between which frames is mounted a cross-piece I, the opposite end portions of which serve as studs around which the gears G G' turn while its middle portion is formed as a hub encircling the shaft C and which may form a bearing $e$ for this shaft. This shaft is also shown as having a thrust bearing $f$ in a cross-frame $g$, which also forms a bearing $b$. The outer shaft C' may have its thrust bearing at $h$ against the hub $e$. The frames $c\ c'$ thus support the entire group of gearing between them, and these frames are extended laterally and terminate in feet which are adapted for attachment to some suitable part of the torpedo. The preferred attachment is that shown in Fig. 1, where the feet are formed as perforated bosses engaging the ends of studs fixed to the transverse bulkhead K. The frames $c\ c'$ are preferably of identical construction, being mates. The described construction enables the entire propulsion system to be assembled as a unit exterior to the torpedo and then inserted bodily therein.

The details of construction may be greatly varied without departing from the essential features of the invention.

The turbine wheels D D' require, of course, to have their buckets oppositely pitched in order that the fluid received by the initial wheel D' from the nozzle $i$ may be reversed in direction and delivered thence into the opposite buckets of the secondary wheel D, this being well understood in turbine construction. The nozzle $i$ is shown as formed in a cross-partition or bulkhead K which divides the turbine hull.

Any suitable kind of bearings may be used and any suitable means may be provided for supplying lubricant for these bearings. If in any case the avoidance of gyroscopic effect of the turbine is not deemed important either turbine wheel D or D' might be omitted; for example, the secondary wheel D might be omitted with its shaft E, pinion F and gear G, the other parts being retained as shown; in such case the pinion H would serve solely as an idler and might be omitted.

What I claim is:—

1. In a torpedo, the combination of a turbine engine mounted on a transverse axis, a pinion driven thereby, a gear wheel meshing with said pinion, a bevel pinion driven at reduced speed therefrom, opposite bevel gears driven in contrary directions by said pinion, outer and inner propeller shafts carrying the respective gears, and propellers carried by said shafts respectively.

2. In a torpedo, the combination of a turbine engine, comprising oppositely rotating turbine wheels, pinions connected thereto respectively, gear wheels meshing with said pinions, bevel pinions carried by said respective gear wheels, opposite bevel gears driven in contrary directions from said pinions, outer and inner propeller shafts carrying the respective gears, and propellers carried on said shafts respectively.

3. In a torpedo, the combination of a turbine engine mounted on a transverse axis and comprising oppositely rotating turbine wheels, outer and inner shafts therefor, pinions on said shafts respectively, gear wheels meshing with said pinions, bevel pinions carried by said respective gear wheels, opposite bevel gears driven in contrary directions from said pinions, outer and inner propeller shafts carrying the respective gears, and propellers carried on said shafts respectively.

4. In a torpedo, the combination of a turbine engine on a transverse axis, a shaft therefor, a pinion on said shaft, a gear wheel and bevel pinion driven therefrom, a transverse fixed stud on which said gear and bevel pinion turn, opposite bevel gears driven in contrary directions from said bevel pinion, outer and inner propeller shafts carrying said respective bevel gears, and propellers carried on said shafts respectively.

5. In a torpedo, the combination of a turbine engine comprising oppositely rotating turbine wheels on a transverse axis, outer and inner shafts therefor, pinions on said shafts, gear wheels on a transverse axis meshing with said pinions and having bevel pinions, said gear wheels and bevel pinions turning on a fixed transverse stud, opposite bevel gears driven in contrary directions from said pinions, outer and inner propeller shafts carrying the respective bevel gears, and propellers carried on said shafts respectively.

6. A propulsion unit for an automobile torpedo comprising a turbine engine on a transverse axis, inner and outer propeller shafts, reducing and reversing gearing between said engine and shafts whereby the latter are driven at reduced speeds in contrary directions, and a bearing frame for said gearing, engine, and shafts adapted to be inserted in or removed from the torpedo as a whole.

7. A propulsion unit for an automobile torpedo comprising a turbine engine having oppositely rotated turbine wheels on a transverse axis, inner and outer propeller shafts, reducing and reversing gearing between said turbine wheels and shafts whereby the latter are driven at reduced speeds in contrary directions, and a bearing frame for said gearing, engine, and shafts adapted to be inserted in or removed from the torpedo as a whole.

8. A propulsion unit for an automobile torpedo comprising a turbine engine on a transverse axis, inner and outer propeller shafts, reducing and reversing gearing between said engine and shafts whereby the latter are driven at reduced speeds in contrary directions, and a bearing frame for said gearing, engine, and shafts comprising frames carrying said gearing between them and having feet adapted to be fastened into the torpedo.

In witness whereof, I have hereunto signed my name in the presence of two subscribing witnesses.

FRANK M. LEAVITT.

Witnesses:
H. F. HUGHES,
F. L. COLWELL, Jr.